United States Patent [19]

Schetinin et al.

[11] 3,795,349

[45] Mar. 5, 1974

[54] DEVICE FOR CONVEYING LIQUID SAMPLES THROUGH PIPELINE BY COMPRESSED AIR

[76] Inventors: Vasily Ivanovich Schetinin, ulitsa Proletarskaya, 96; Jury Valerianovich Reutsky, Shkolny Pereulok, 4, kv. 12, both of Zyryanovsk Vostochno-Kazakhstanskoi oblasti, U.S.S.R.

[22] Filed: Feb. 23, 1973

[21] Appl. No.: 335,158

Related U.S. Application Data

[63] Continuation of Ser. No. 87,946, Nov. 9, 1970, abandoned.

[52] U.S. Cl.............. 222/193, 137/209, 222/400.5, 222/450, 302/53
[51] Int. Cl.................................. B65g 53/10
[58] Field of Search... 222/373, 380, 193, 194, 397, 222/400.5, 400.7, 424.5, 442, 447, 450, 453, 222/504; 302/53, 54, 55; 137/209; 417/118; 417/122, 137

[56] References Cited
UNITED STATES PATENTS

| | | | |
|---|---|---|---|
| 2,645,906 | 7/1953 | Ryan | 137/209 X |
| 2,884,937 | 5/1959 | Myers | 137/209 X |
| 3,169,676 | 2/1965 | Hanselmann | 222/380 X |
| 3,625,571 | 12/1971 | Kimm | 222/504 |

*Primary Examiner*—Robert B. Reeves
*Assistant Examiner*—Thomas E. Kocovsky
*Attorney, Agent, or Firm*—Holman & Stern

[57] ABSTRACT

A sampling device for conveying a liquid sample through a pipeline with the aid of compressed air uses a container having an outlet hole, and accumulating the liquid sample; the container is connected with a source of compressed air and the pipeline, and is in communication with the pipeline through a conoid attachment; a shut-off element which closes the outlet hole of said container is disposed inside the container.

2 Claims, 2 Drawing Figures

PATENTED MAR 5 1974 3,795,349

DEVICE FOR CONVEYING LIQUID SAMPLES THROUGH PIPELINE BY COMPRESSED AIR

This is a continuation, of application Ser. No. 87,946, filed Nov. 9, 1970, now abandoned.

BACKGROUND OF THE INVENTION

1. Field of the Invention

The present invention relates to means of automation used for controlling elemental composition of suspensions, metallurgical slimes and chemical solutions and more specifically it relates to devices for conveying their samples through pipelines with the aid of compressed air.

2. Description of the Prior Art

While checking the composition of the above-mentioned ore processing products by X-ray-spectrum or radioactive methods of analysis, the most labour- and time-consuming operation is conveyance of the sample from the sampling point to the analyzer. If the operations related to drawing and conveying samples are not automated, the possibilities of the above-mentioned methods of analysis become considerably narrower.

The most widespread method of conveying the periodically drawn samples from the sampling points to the analyzer is by the use of pumps. The flow of the samples pumped from these points are fed successively into the measuring cell of the analyzer. In the intervals between the analysis the samples are returned into the processing line past the measuring cell. To avoid clogging the pipeline with solid particles, the samples are continuously pumped through said pipeline.

However, this method of conveying samples has the following disadvantages.

The volume of the sample has to be large and not withstanding the sample proper is insufficiently representative since it gives an idea of only a very short duration of the process.

If a more representative sample is required, it becomes necessary in the intervals between the analysis to collect the entire pumped sample into containers provided with an agitator. During the analysis the sample is returned into the processing line with only a small portion taken off for the analysis.

The continuously operating pumps and agitators call for heavy unproductive expenditure of energy because the samples are pumped to the analyzer in considerably larger volumes than required for the analysis.

Furthermore, the distance and height (i.e., the head) to which the pump is able to deliver the samples of suspensions and metallurgical slimes are limited; therefore the selection of the sites for installing the analyzer is also limited.

Known in the art is a device for conveying liquid samples through a pipeline with the aid of compressed air, which comprises a container for accumulating the material delivered from the sampler, this container being connected with a source of compressed air and the pipeline, and shut-off elements for admitting the sample and compressed air into the container and discharging them into the pipeline, as well as means for actuating the shut-off elements (see I.G. Greenman "Automation of processes in beneficiation of non-ferrous metal ores," Alma Ata, published by the Academy of Sciences of the Kazakh SSR, 1964, pp. 197–201).

The known device has inlet branch pipes for admitting samples and compressed air into the container and an outlet branch pipe for discharging them into the pipeline during conveyance of the sample.

The outlet branch pipe is connected to the pipeline by a rubber hose which is squeezed by a suitable means during the accumulation of the sample and released when the sample begins to be conveyed through the pipeline. The inlet branch pipe is shut-off in a similar way while compressed air is being fed for conveying the sample.

This device, too, has disadvantages in that the outlet shut-off element is located between the branch pipe and the pipeline and that there is no smooth transition from the internal surface of the container to the pipeline.

These disadvantages cause the conveyed liquid sample to gain speed very slowly in the pipeline; as a result, the central axial part of the flow moves faster than the boundary layers so that the flow of liquid is broken through with air which leads to losses of the sample material in the pipeline. Besides, when the conveyed metallurgical slimes and suspensions have a high content of solid matter, the point where the outlet branch pipe is connected to the pipeline is apt to become clogged.

These are same reasons why the known device has not found much application in practice.

SUMMARY OF THE INVENTION

An object of the present invention is to provide such a device for conveying liquid samples through a pipeline which would deliver the sample without losses and at a high speed.

Another object of the invention is to provide such a device for conveying liquid samples through a pipeline which would allow the suspension and slime samples accumulated from several portions within a few minutes or hours in the volume required for the analysis to be conveyed from the sampling point to the analyzer without clogging the pipeline.

Still another object of the invention is to provide such a device for conveying liquid samples through a pipeline which could be used in the elemental composition control systems by analyzing either liquid samples or the samples of suspensions or metallurgical slimes which are preliminarily dehydrated and delivered to the analyzer in the form of a tablet.

A further object of the invention is to provide such a device for conveying liquid samples through a pipeline which, owing to simplicity of its design and operational reliability, would reduce the expenses for introducing and operating the system of process control.

With these and other objects in view the present invention resides in a device for conveying liquid samples through a pipeline with the aid of compressed air comprising a container for accumulating the sample delivered thereto from a sampler, said container communicating with a source of compressed air and the pipeline, shut-off elements admitting the sample and compressed air into the container and discharging them into the pipeline, as well as means for actuating the shut-off elements. According to the invention, the container is connected with the pipeline via a conoid attachment while the shut-off element which closes the outlet hole of the container is located inside said container.

The device for conveying liquid samples through a pipeline with the aid of compressed gas, according to the invention, makes it possible to convey the samples of suspensions, metallurgical slimes and chemical solutions through pipelines without losses, at high speeds and over unlimited distances.

BRIEF DESCRIPTION OF THE DRAWING

Now the invention will be described in detail by way of example with reference to the drawings in which.

Figure 1:
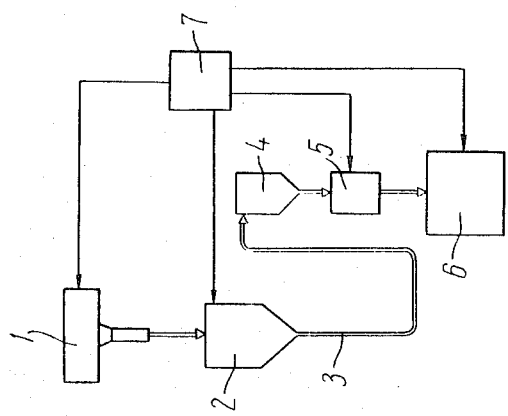
FIG. 1 is an elementary diagram of controlling the elemental composition of the ore processing products.

The diagram presented in FIG. 1 shows a sampler 1 which draws samples from the flows of ore processing products, a device 2 for accumulating the liquid sample and conveying it through a pipeline 3 with the aid of compressed air, a device 4 for receiving the sample and retarding its movement, a device 5 which prepares the sample for the analysis, an analyzer 6 and a control unit 7 which controls the operation of the above-listed devices and instruments. The connecting lines and arrows on this diagram show the relationship between said devices and instruments.

Figure 2:
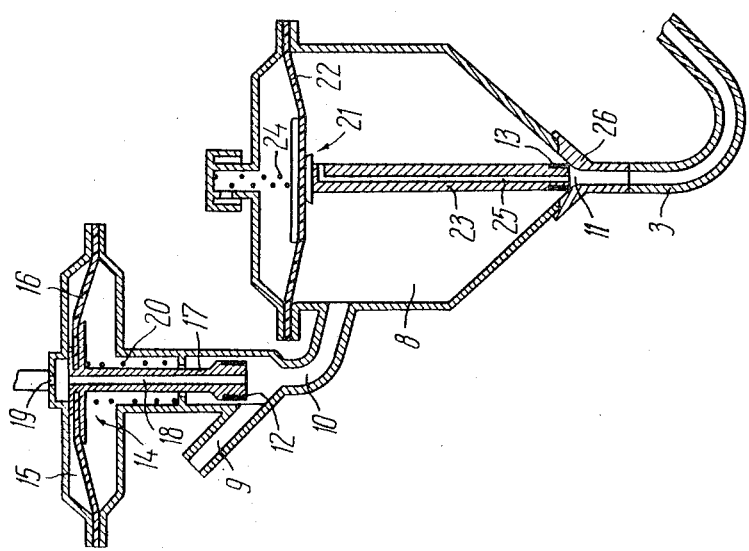
FIG. 2 is a device for conveying liquid samples through a pipeline with the aid of compressed air, according to the invention.

The device 2 for conveying liquid samples through the pipeline 3 with the aid of compressed air has a container 8 (FIG. 2) for accumulating the sample delivered into it from the sampler 1 through a passage 9 and an inlet hole 10. The compressed air is fed into the container 8 through the same inlet hole 10. An outlet hole 11 of the container 8 connects the latter with the pipeline 3. The inlet hole 10 is closed by a shut-off element 12 in the form of an elastic plug whereas the outlet hole 11 is closed by a shut-off element 13 also made in the form of an elastic plug.

The shut-off elements 12 and 13 are actuated by pneumatic devices. A device 14 for actuating the shut-off element 12 is made in the form of a working chamber 15 connected with a source of compressed air, and a diaphragm 16 which serves as the lower wall of this chamber and is connected by a rod 17 with the shut-off element 12.

The rod 17 is made hollow for communicating the working chamber 15 with the container 8 through a passage 18 while the compressed air is being fed from its source through a hole 19 into the working chamber 15 when the shut-off element 12 actuated by the rod 17 of the diaphragm 16 closes the inlet hole 10 of the container 8. When compressed air enters the chamber 15, the diaphragm 16 goes down in spite of the escape of compressed air from this chamber through the channel 18 because this channel offers resistance to the air flow so that a certain pressure of compressed air is built up in the chamber 15. When the delivery of compressed air into the working chamber 15 is discontinued, the shut-off element 12 is moved by a spring 20 to the initial position thus again putting the container 8 in communication with the sampler 1 through the passage 9.

A device 21 for actuating the shut-off element 13 is made in the form of a diaphragm 22 which serves as the upper wall of the container 8, is connected with the shut-off element 13 by a rod 23 and opens the outlet hole 11 when compressed air is admitted into the container 8 which serves simultaneously as the working chamber of this device. When the delivery of compressed air into the container 8 stops, the shut-off element 13 actuated by a spring 24 closes the outlet hole 11. The rod 23 is provided with a passage 25 which connects the container 8 with the pipeline 3 for discharging or venting the air when the container is being filled with the sample.

The container 8 communicates with the pipeline through a conoid attachment 26.

The device 2 for conveying liquid samples through the pipeline 3 with the aid of compressed air operates as follows. The required number of portions of the controlled material is accumulated in the container 8 with the aid of the sampler 1. The samples enter the container through the inlet passage 9 and the inlet hole 10. Compressed air is delivered through the hole 19 into the working chamber 15; this presses down the diaphragm 16 with the rod 17 thus closing the inlet hole 10 and cutting off the communication between the container 8 and the sampler 1 through the passage 9. The compressed air flows from the chamber 15 through the passage 18 in the rod 17 into the container 8, the diaphragm 22 with the rod 23 is forced upward thus admitting the sample into the pipeline 3 after which the sample is pushed by the compressed air to the receiving device 4 in the form of a cylindrical mass whose length depends on the volume of the sample being conveyed. Further, at a compressed air pressure of 5–8 atm the sample can move through a pipeline of 15 mm diameter at a speed of 8–12 m/s; therefore, before the sample is admitted into the device 5 which prepares the sample for analysis (reduction, filtration, screening, etc.) it is necessary to reduce the speed considerably. In the receiving device 4 the speed of the sample is reduced by changing sharply the direction of its movement and by widening the conveying pipe. The same device is used for separating the sample from compressed air.

On completion of one cycle of the sample conveyance, the delivery of compressed air is stopped, the shut-off elements are returned to the initial positions by the springs 20 and 24 and the cycle of accumulating the sample and conveying it to the analyzer 6 is resumed.

The design of the device 2 ensures reliable operation of the devices 14 and 21 for actuating the shut-off elements. At a compressed air pressure of 5–8 atm the sample is admitted into the pipeline 3 with the aid of the conoid attachment 26 at a speed of 20–35 m/s. At such a speed the effect of conversion of potential into kinetic energy is very high so that the solid particles of the sample entrained by the liquid reach the above-quoted speeds before entering the pipeline 3, therefore, the solid particles do not lag behind the liquid and are almost fully carried out of the pipeline.

After the sample has entered the pipeline 3, its speed is reduced from 20–35 m/s to 8–12 m/s owing to to the resistance of the pipeline.

Prolonged accumulation and storage of the suspension and slime samples in the container 8 does not affect adversely the conditions of their conveyance. If the sample has time enough for settling in the container 8 then at first high density suspension or metallurgical slime enters the receiving device 4, then its clarified portion.

In view of the fact that the sample moves through the pipeline in the form of a cylindrical mass a few meters long, it can be delivered to the analyzer from the sampling points over any distance.

The analyzer 6 can be located in a convenient place which is free from vibrations and where it lends itself easily to air conditioning and screening of the apparatus. All this simplifies the requirements for the apparatus, increases its reliability and operational accuracy and allows one high-efficiency analyzer to be used for successive control of a number of points with a rapidity sufficient for automatic control of the technological process.

While the sample is being conveyed, its flow in the pipeline is highly turbulent and consequently the sample is homogeneous in a cross-sectional area; therefore, if necessary, it becomes very simple to separate a representative portion of the sample in the receiving device 4 or to divide it into several flows and direct them to different analyzers intended for determining, for example, the composition, granulometric, ionic characteristics and other parameters.

The present device ensures automated control of the elemental composition of suspensions or metallurgical slimes while analyzing either liquid samples or dehydrated samples delivered to the analyzer in the form of tablets.

The above-described device for conveying liquid samples through a pipeline with the aid of compressed air has been introduced into the process of beneficiation of polymetallic ores and has produced positive results by stepping up the output of an X-ray-spectrum analyzer to 60 samples per hour, determining in each sample the iron, copper, zink and lead contents.

What we claim is:

1. A device for conveying liquid samples containing solid matter along a pipeline with the aid of compressed gas, until said device and said pipeline are fully free of said samples, said device comprising a container for accumulating a mixture of liquid and solid matter, said container having a conic bottom portion defining a discharge channel which gradually connects said container with said pipeline, said discharge channel having an inlet; a first shut-off element having a first vertical rod member disposed inside said container, the bottom end of said rod member closing the inlet of said discharge channel; a first actuating means coupled to said rod member and including a diaphragm with a displacing spring, said diaphragm forming an upper wall of said container and responding to an increase of gas pressure within said container to move upward said first vertical rod member thereby opening the inlet of said discharge channel, said first rod member being attached at the top end thereof to an undersurface of said diaphragm, and means provided in said first shut-off element for providing communication between the container and the pipe, said means being in the form of an axial passage in said first rod member; said container further including an inlet through which the mixture of liquid and solid matter passes into said container; a second shut-off element having a second vertical rod member disposed in the inlet, the bottom end of said second rod member closing said inlet; and a second actuating means operatively connected to said second rod member.

2. A device as defined in claim 1, wherein said second rod member includes spring biasing means and has an axial passage therethrough, and wherein said second actuating means comprises a pressure-sensitive diaphragm coupled to said second rod member which actuates to close said inlet passage on admission of compressed gas on one side thereof, said axial passage in said second rod member connecting the admitted compressed gas to said container in a closed position of said second shut-off element.

* * * * *